(12) United States Patent
Williams et al.

(10) Patent No.: US 8,608,143 B2
(45) Date of Patent: Dec. 17, 2013

(54) PIPE CLAMP DEVICE AND A METHOD FOR ITS USE

(71) Applicants: Wayne Michael Williams, North Las Vegas, NV (US); Alex V. Palominos, North Las Vegas, NV (US)

(72) Inventors: Wayne Michael Williams, North Las Vegas, NV (US); Alex V. Palominos, North Las Vegas, NV (US)

(*) Notice: Subject to any disclaimer, the term of this patent is extended or adjusted under 35 U.S.C. 154(b) by 0 days.

(21) Appl. No.: 13/713,618

(22) Filed: Dec. 13, 2012

(65) Prior Publication Data

US 2013/0185926 A1    Jul. 25, 2013

Related U.S. Application Data

(60) Provisional application No. 61/569,842, filed on Dec. 13, 2011.

(51) Int. Cl.
*B25B 5/16* (2006.01)

(52) U.S. Cl.
USPC ........ 269/6; 269/3; 269/95; 269/143; 29/257; 29/270; 29/276

(58) Field of Classification Search
USPC .............. 269/143, 249, 6, 3, 95; 29/257, 276, 29/270, 244
See application file for complete search history.

(56) References Cited

U.S. PATENT DOCUMENTS

| 4,398,706 A * | 8/1983 | Kaulfuss .................. 269/88 |
| 4,553,305 A | 11/1985 | Dearman |
| 4,586,647 A | 5/1986 | Dearman |
| 5,135,209 A | 8/1992 | Penny |
| 5,765,902 A * | 6/1998 | Love .................. 296/100.01 |
| 5,863,035 A * | 1/1999 | Howell .................. 269/246 |
| 6,000,686 A * | 12/1999 | Yates .................. 269/6 |
| 6,032,939 A * | 3/2000 | Chen .................. 269/249 |
| 6,349,869 B1 | 2/2002 | McBee |
| 7,004,682 B1 * | 2/2006 | Moody .................. 405/184.4 |
| 2004/0232608 A1 * | 11/2004 | Wong .................. 269/249 |

* cited by examiner

*Primary Examiner* — Lee D Wilson
(74) *Attorney, Agent, or Firm* — Muskin & Farmer, LLC; Shawn R. Farmer; Jon H. Muskin

(57) ABSTRACT

The present pipe clamp device is configured for use with standard vee head jack stands. The present device can be used to secure a pipe or similarly shaped object to a standard vee head jack stand. Specifically, the present pipe clamp device can comprise one or more pivoting arms that can facilitate an object's placement into the pipe clamp device or its removal from the pipe clamp, a threaded rod, which can include a release button or quick release mechanism, which can be used to quickly tighten the clamp onto an object being secured and the jack stand or to remove an object from the jack stand.

20 Claims, 8 Drawing Sheets

_PIPE CLAMP DEVICE AND A METHOD FOR ITS USE_

CROSS REFERENCE TO RELATED APPLICATIONS

This application claims benefit to provisional patent application No. 61/569,842 filed Dec. 13, 2011, which is incorporated by reference herein in its entirety.

FIELD OF THE INVENTION

The present pipe clamp device can be used to secure many sizes of pipes or other similarly shaped objects to a standard jack stand such that only one person can be able to use the device to easily secure a pipe or similarly shaped object to the jack stand.

BACKGROUND

Welders and pipe fitters are often required to construct work pieces comprising various sections of pipe. These pipes often have varying diameters and pipe jack stands are commonly used to support the pipe so that it can be held at a level that is suitable for a worker to perform the work required to complete the task. To accommodate different diameters of pipes, such stands typically comprise a V-shaped cradle configured for use with many sizes of pipe. The heights of such stands can typically be adjusted through the use of a threaded connection between the V-shaped cradle and a pole that extends down to a support, which holds the stand upright. When the V-shaped cradle is adjusted to a desired height, the pipe can be placed into the cradle and maintained at this height. However, the user often requires a second person to hold the pipe securely to the pipe jack stand so that welding or other work requiring more than one hand can be performed on the pipe or similarly shaped object.

One solution that is sometimes used to allow a person to work on a pipe without assistance requires the pipe to be tack welded to the stand. Tack welds take additional time both to connect the pipe to the stand and to be removed from the surface of the pipe once the fabrication is complete. Other solutions have also been introduced, which involve the use of clamps to hold a pipe securely while the work is being performed. Such clamps are related to the present pipe clamp device, however, they are typically cumbersome to use, making securing a pipe to a jack stand using these devices difficult, particularly when used by a single operator.

What is needed is a pipe clamp device that is capable of securing pipes of many different diameters to a standard pipe jack stand which can be quickly and easily installed and removed by a single operator.

SUMMARY OF THE INVENTION

It is an aspect of the present device to provide a pipe clamp device that is capable of securing pipes and similarly shaped objects of a variety of diameters to a standard pipe jack stand, which can also be easy for a person to operate without requiring the assistance of others.

The above aspect can be obtained by a pipe clamp device for use with a standard vee head jack stand, the pipe clamp device comprising: an inverted U-shaped main body comprising a closed top end and an open bottom end, an inner surface and an outer surface; the open bottom end of the inverted U-shaped main body comprising a first stationary arm, having an inner surface and an outer surface, and having a lower end and a second stationary arm, having an inner surface and an outer surface, and having a lower end, wherein the second stationary arm comprises a second gripping ear at its lower end; the closed top end of the inverted U-shaped main body comprising a head, the head further comprising a threaded hole configured to receive a threaded rod; the threaded rod having a first end and a second end located within the threaded hole; and a first pivoting arm, having an inner surface and an outer surface, and having a first end and a second end, the first end of the first pivoting arm pivotably connected to the lower end of the first stationary arm by a first hinge, wherein the second end of the first pivoting arm comprises a first gripping ear.

The above aspect can also be obtained by a pipe clamp device for use with a standard vee head jack stand, the pipe clamp device comprising: an inverted U-shaped main body comprising a closed top end and an open bottom end, an inner surface and an outer surface; the open bottom end of the inverted U-shaped main body comprising a first stationary arm, having an inner surface and an outer surface, and having a lower end and a second stationary arm, having an inner surface and an outer surface, and having a lower end, wherein the second stationary arm comprises a second gripping ear at its lower end; the closed top end of the inverted U-shaped main body comprising a head, the head further comprising a threaded hole configured to receive a threaded rod; the threaded rod having a first end and a second end located within the threaded hole; a first pivoting arm, having an inner surface and an outer surface, and having a first end and a second end, the first end of the first pivoting arm pivotably connected to the lower end of the first stationary arm by a first hinge, wherein the second end of the first pivoting arm comprises a first gripping ear; and a second pivoting arm, having an inner surface and an outer surface, and having a first end and a second end, the first end of the second pivoting arm pivotably connected to the lower end of the second stationary arm by a second hinge, wherein the second end of the second pivoting arm comprises a second gripping ear.

The above aspect can also be obtained by a method for securing an object to a standard vee head jack stand using a pipe clamp device, the method comprising: providing a pipe clamp device, the pipe clamp device comprising: an inverted U-shaped main body further comprising a closed top end and an open bottom end, an inner surface and an outer surface; the open bottom end of the inverted U-shaped main body further comprising a first stationary arm having an inner surface and an outer surface and having a lower end and a second stationary arm having an inner surface and an outer surface and having a lower end, wherein the second stationary arm comprises a second gripping ear at its lower end; the closed top end of the inverted U-shaped main body comprising a head, the head further comprising a threaded hole configured to receive a threaded rod; the threaded rod having a first end and a second end located within the threaded hole; and a first pivoting arm, having an inner surface and an outer surface, and having a first end and a second end, the first end of the first pivoting arm pivotably connected to the lower end of the first stationary arm by a first hinge, wherein the second end of the first pivoting arm further comprises a first gripping ear; providing a standard vee head jack stand comprising a V-shaped cradle; providing an object; placing the object on the V-shaped cradle of the standard vee head jack stand, the V-shaped cradle having an upper surface and a lower surface; moving the first pivoting arm of the pipe clamp device into an open position; placing the pipe clamp device over the standard vee head jack stand so that the first gripping ear and the second gripping ear are each located near the lower surface of the V-shaped cradle and the object is within the inner surfaces of the first stationary arm, first pivoting arm and second stationary arm and the second end of the threaded rod is located directly above the object; moving the first pivoting arm of the pipe clamp device into a closed position; moving the threaded rod so that the second end of the threaded rod moves toward the open end of the pipe clamp device and away from the closed end of the pipe clamp device until the second end of the threaded rod makes contact with the object, and presses against the object and against the upper side of the V-shaped cradle and causing the first gripping ear and second gripping ear to move toward the V-shaped cradle and press against the V-shaped cradle.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1:
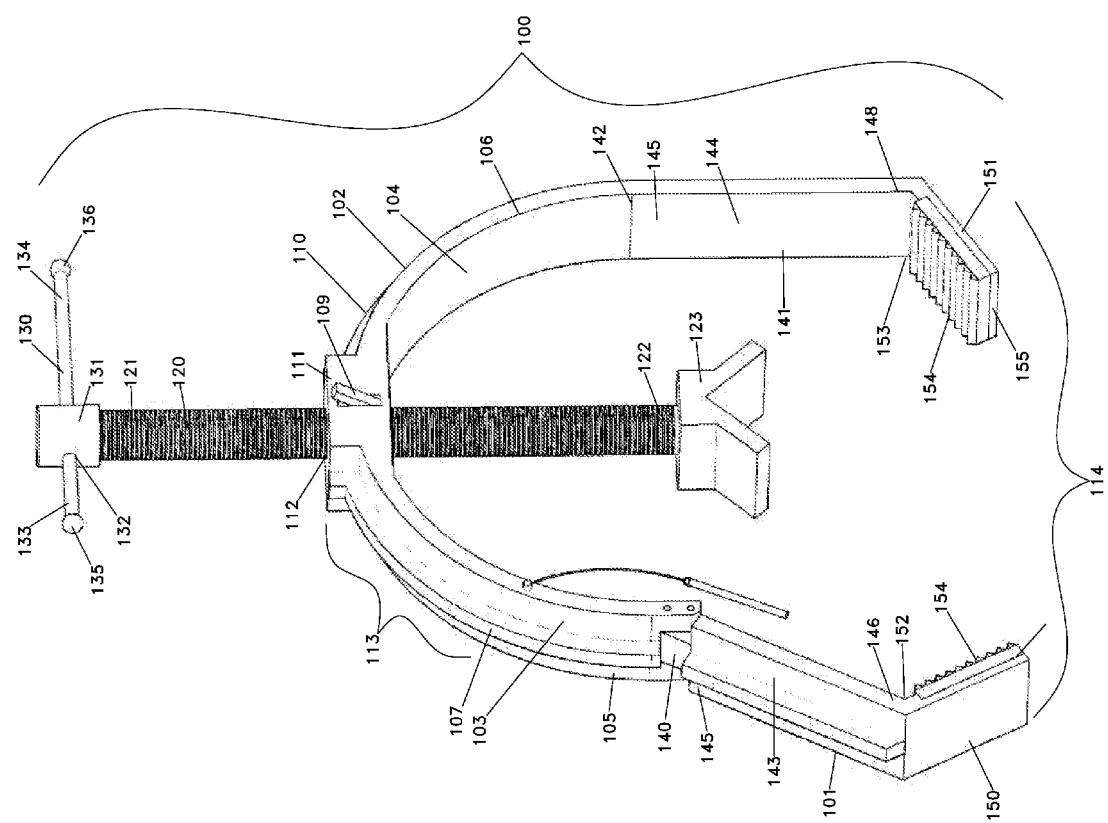
FIG. 1/8 is a perspective front and side view drawing of a pipe clamp device having a first pivoting arm in an open position according to an embodiment.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

The present pipe clamp device can be used to secure a pipe, ducting or any other similarly shaped object onto a standard jack stand. In an embodiment, the present pipe clamp device can have an inverted U-shape with an open end at its bottom and a closed end at its top and a work area located between the open end and closed end. The open end of the inverted U-shape can comprise two arms, wherein at least one arm can be a pivoting arm, which can be used to secure the pipe clamp device to a jack stand within the work area while also allowing a pipe or other work piece to be more easily removed from the clamp.

A threaded rod or similar feature for tightening an object to a jack stand can be connected to the closed end. When this threaded rod is rotated, a swivel vee or similar device can be moved either toward the closed end or toward the open end of the pipe clamp device. By turning the threaded rod so as to move the swivel vee toward the open end of the pipe clamp device, the device can secure a pipe to a jack stand by exerting pressure on the pipe between the swivel vee and the jack stand. Likewise, by turning the threaded rod so as to move the swivel vee toward the closed end of the pipe clamp device, the pipe can be released from the jack stand. The use of one or more pivoting arms can facilitate the removal of a pipe from the jack stand or the insertion of a pipe into the pipe clamp device. The tightening feature, as well as the shape of the clamp and the shape of the swivel vee when used in conjunction with at least one pivoting arm, can allow for this device to securely hold work pieces of various sizes and shapes to a typical jack stand. The present pipe clamp device comprises a distinct advantage over prior art in its ability to facilitate the easy installation and removal of pipes and similar work pieces both into and out of the present pipe clamp device. The size of such work pieces would only be limited by the size of the work area of a particular clamp and the present pipe clamp device can be configured to be any size required to work with a particular pipe or similarly shaped object.

FIG. 1/8 is a perspective front and side view drawing of a pipe clamp device 100 having a first pivoting arm 101 in an open position according to an embodiment.

A pipe clamp device 100, as depicted in FIG. 1/8, can be comprised of a main body 102, having an inverted U-shape. This main body 102 can further comprise an outer surface 103 and an inner surface 104, a top end 110, a first stationary arm 105 and a second stationary arm 106. The outer surface 103 of the top end 110 of the main body 102 can comprise a head 111, further comprising a threaded hole 112 (not fully visible in FIG. 1/8). This top end 110 of the main body 102 can also be referred to as the closed end 113 of the pipe clamp device 100. In an embodiment, a threaded rod 120 can be screwed into the threaded hole 112 and a handle 130 can be used to turn the threaded rod 120, thus allowing the threaded rod 120 to move up and down in relation to the main body 102. In an alternative embodiment the threaded rod 120 could be turned by an electric motor (not shown) or any other suitable device capable of creating sufficient torque.

In an embodiment, the outer surface 103 of the main body 102 can also comprise a reinforcing rib 107, which can strengthen the main body 102 making it less likely to bend or flex. This feature can allow greater forces to be applied to the pipe clamp device 100, which can help to better secure a pipe (not shown) or similar object to a jack stand (not shown).

The first stationary arm 105 of the main body 102 can be connected to a first pivoting arm 101 by a first hinge 140. A second pivoting arm 141 can be connected to the second stationary arm 106 of the main body 102 by a second hinge 142. In an alternate embodiment, the second pivoting arm 141 can be replaced by an elongated second stationary arm 108 (not pictured in FIG. 1/8) having a bottom section shaped like the second pivoting arm 141, which would not pivot at all. As with the main body 102, the first pivoting arm 101 and the second pivoting arm 141 can each comprise an outer surface 143 and an inner surface 144 (the inner surface of the first pivoting arm 101 and the outer surface of the second pivoting arm 141 are not shown in FIG. 1/8). Each pivoting arm can also have a first end 145 and a second end 146, 148, wherein the first hinge 140 can be located at the first end 145 of the first pivoting arm 101 and the second hinge 142 can be located at the first end 145 of the second pivoting arm 141. In an embodiment, the outer surface 143 of both the first pivoting arm 101 and the second pivoting arm 141 can each comprise a reinforcing rib 107 configured to strengthen each and make them less likely to bend or flex.

In an embodiment, the first pivoting arm 101 and the second pivoting arm 141 can each comprise gripping ears 150 and 151. Specifically, the second end 146 of the first pivoting arm 101 can comprise a first gripping ear 150 and the second end 148 of the second pivoting arm 141 can comprise a second gripping ear 151. In an embodiment, both the first gripping ear 150 and the first pivoting arm 101 and can be made from a single piece of metal or other material, wherein the first gripping ear 150 can be bent inward at a first angle 152. Similarly, a second gripping ear 151 can be located at the second end 148 of the second pivoting arm 141, which can be bent inward, toward the first gripping arm 101 at a second angle 153, which can be similar to the first angle 152. In an embodiment, the first angle 152 and second angle 153 can be configured to match the corresponding angles of various sizes and shapes of V-head cradles comprising typical jack stands, wherein the first angle 152 and the second angle 153 can be configured so that the gripping ear 150 is parallel to the cradle 382 (not shown in FIG. 1/8 but shown in FIGS. 3/8, 4/8 and 5/8) of the compatible jack stand (not shown). In an embodiment, one or more serrated pads 154 can cover the inner surface 155 of both the first gripping ear 150 and the second gripping ear 151. These serrated pads 154 can be used to secure the pipe clamp device 100 to the underside of a V-head cradle found on a typical jack stand (not shown).

The threaded rod 120 can comprise a first end 121 and a second end 122. The first end 121 can comprise a handle 130 that can be used to rotate the threaded rod 120. The second end 122 can comprise a swivel vee 123, which can be used to secure a pipe to a jack stand (not pictured). In an embodiment, the swivel vee 123 can be V-shaped with an angle similar to the angle formed by the V-shaped cradle comprising many standard jack stands. The swivel vee 123 can also be configured to freely swivel about the second end 122 of the threaded rod 120 so that it can align to accept an object being secured when the pipe clamp device 100 is tightened by turning the threaded rod 120 so as to move the swivel vee 123 toward the open end 114 and toward the cradle of a jack stand (not shown in FIG. 1/8 but shown in FIGS. 3/8, 4/8, 5/8 and 6/8).

In an embodiment, the handle 130 can be connected to a handle body 131 connected to the first end 121 of the threaded rod 120. This handle body 131 can comprise a handle body hole 132, which can allow the handle 130 to slide freely through the handle body hole 132. In an embodiment, the handle 130 can have a first handle end 133 and a second handle end 134 wherein a first stop 135 can be located at the first handle end 133 and a second stop 136 can be located at a second handle end 134. The first stop 135 and second stop 136 can prevent the handle 130 from being removed from the handle body hole 132 connected to the threaded rod 120.

The threaded hole 112 in the head 111 on the top end 110 can be configured to accept the threading of the threaded rod 120 by comprising complementary threading within the threaded hole 112. This complementary threading can allow the threaded rod 120 to be moved up and down through the threaded hole 112 when the threaded rod 120 is turned either clockwise or counter-clockwise, allowing the pipe clamp device 100 to be adjustable for use with many different sizes of pipes or similarly shaped objects (not shown). Preferably, the head 111 can also comprise a release button 109 that can be used to allow the threaded rod 120 to move freely up and down through the threaded hole 112. The release button can be a threaded piece that, when engaged, causes the threading on the inside of the threaded hole 112 to come in contact with the threaded rod 120. When the release button 109 is switched open, the threading inside the threaded hole 112 disengages from the threaded rod 120, which can allow the threaded rod 120 to move up and down quickly without the need to rotate the threaded rod 120. The release button can be used when large adjustments in distance of the threaded rod 120 to the object (not pictured) need to be made. The release button 109 can also comprise a spring loaded mechanism which will be described in more detail below.

Figure 2:
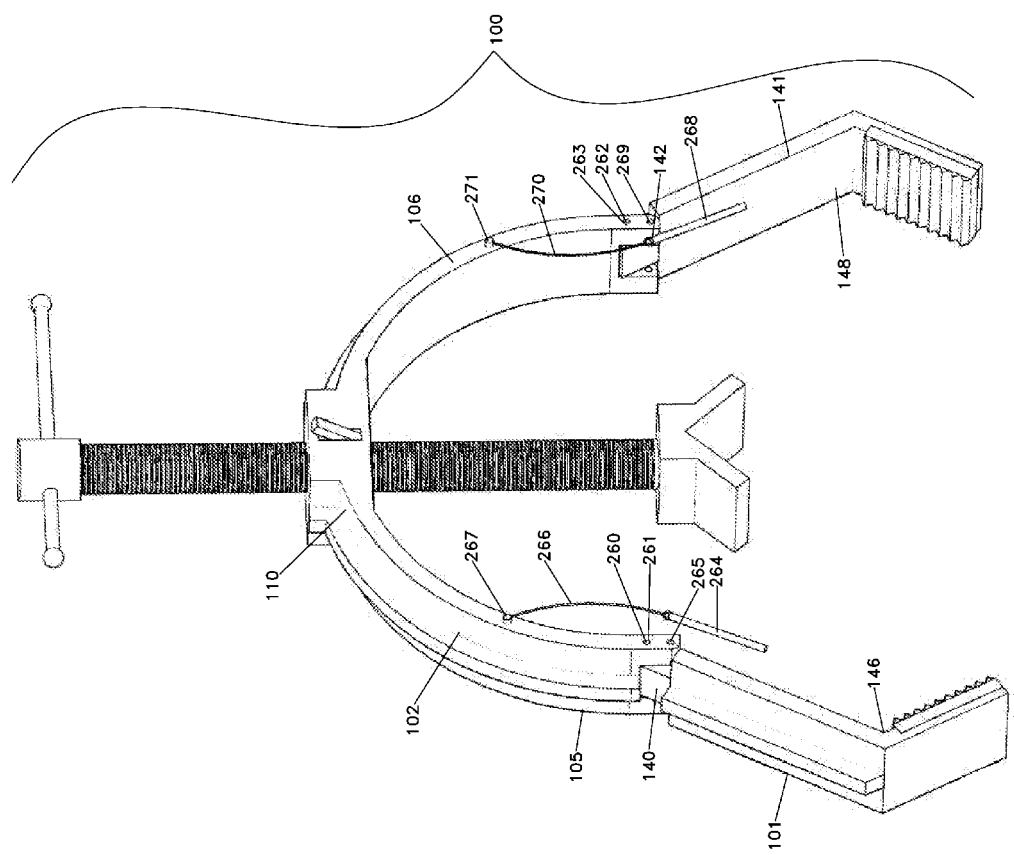
FIG. 2/8 is a perspective front and side view drawing of a pipe clamp device wherein both its first pivoting arm and second pivoting arm are in open positions according to an embodiment.

FIG. 2/8 is a perspective front and side view drawing of a pipe clamp device 100 wherein having a first pivoting arm 101 and a second pivoting arm 141 in open positions according to an embodiment.

The first pivoting arm 101 can be connected to the first stationary arm 105 by the first hinge 140 at a location that can allow a pipe to be placed into, or removed from, the pipe clamp device 100 when the first pivoting arm 101 is placed into an open position Likewise, a second pivoting arm 141 can be connected to the second stationary arm 106 by the second hinge 142 at a location that can allow a pipe to be placed into, or removed from, the pipe clamp device 100 when the second pivoting arm 141 is placed into an open position. In an embodiment, the first hinge 140 can be located roughly midway between the top end 110 of the main body 102 and the second end 146 of the first pivoting arm 101 and the second hinge 142 can be located midway between the top end 110 of the main body 102 and the second end 148 of the second pivoting arm 141.

A first pivot pin 260 can extend through a first hole 261 extending through both the first stationary arm 105 and the first pivoting arm 101 thus creating the first hinge 140 wherein the first pivoting arm 101 can be configured to rotate freely in a vertical direction about the first stationary arm 105. In an embodiment, a second pivot pin 262 can extend through a second hole 263 extending through both the second stationary arm 106 and the second pivoting arm 141 thus creating the second hinge 142 wherein the second pivoting arm 141 can rotate freely in a vertical direction about the second stationary arm 106.

In an embodiment, a first locking pin 264 can be inserted below the first pivot pin 260 and can be used to prevent movement of the first pivoting arm 101 about the first hinge 140 with relation to the first stationary arm 105 by locking the first hinge 140 in a closed position. The first pivoting arm 101 can be locked in a closed position by placing the first locking pin 264 through a first locking pin hole 265, which can extend through the first stationary arm 105 and the first pivoting arm 101. In an embodiment, the first locking pin 264 can comprise a chain 266 or cable that can be used to retain the first locking pin 264, which can be connected to the first stationary arm 105 through the use of a connection piece 267 to prevent dropping or misplacing the first locking pin 264. The first locking pin 264 can be removed to allow the first pivoting arm 101 to be placed into an open position.

In an embodiment, a second locking pin 268 can be inserted through a second locking pin hole 269 located below the second pivot pin 262 to prevent movement of the second pivoting arm 141 about the second stationary arm 106 by locking the second hinge 142 in a closed position. The second locking pin 268 can be placed through a second locking pin hole 269, which can extend through the second stationary arm 106 and the second pivoting arm 141. In an embodiment, the second locking pin 268 can comprise a chain 270 that can be used to retain, which can itself be connected to the second stationary arm 106 through the use of a connection piece 271. The second locking pin 268 can be removed from the second locking pin hole 269 to allow the second pivoting arm 141 to be moved into an open position as shown in FIG. 2/8.

When either the first pivoting arm 101 or the second pivoting arm 141 of the pipe clamp device 100 is placed into an open position, pipes or other similar objects can be placed into the pipe clamp device 100 or removed from the pipe clamp device 100. Furthermore, when either the first pivoting arm 101 or the second pivoting arm 141 of the pipe clamp device 100 is placed into an open position, the pipe clamp device 100 can easily be placed into a position relative to a jack stand (not pictured in FIG. 2/8) wherein the pipe clamp device 100 can secure a pipe or similarly shaped object to the jack stand when the first pivoting arm 101 and the second pivoting arm 141 of the pipe clamp device 100 are placed into a closed position.

Figure 3:
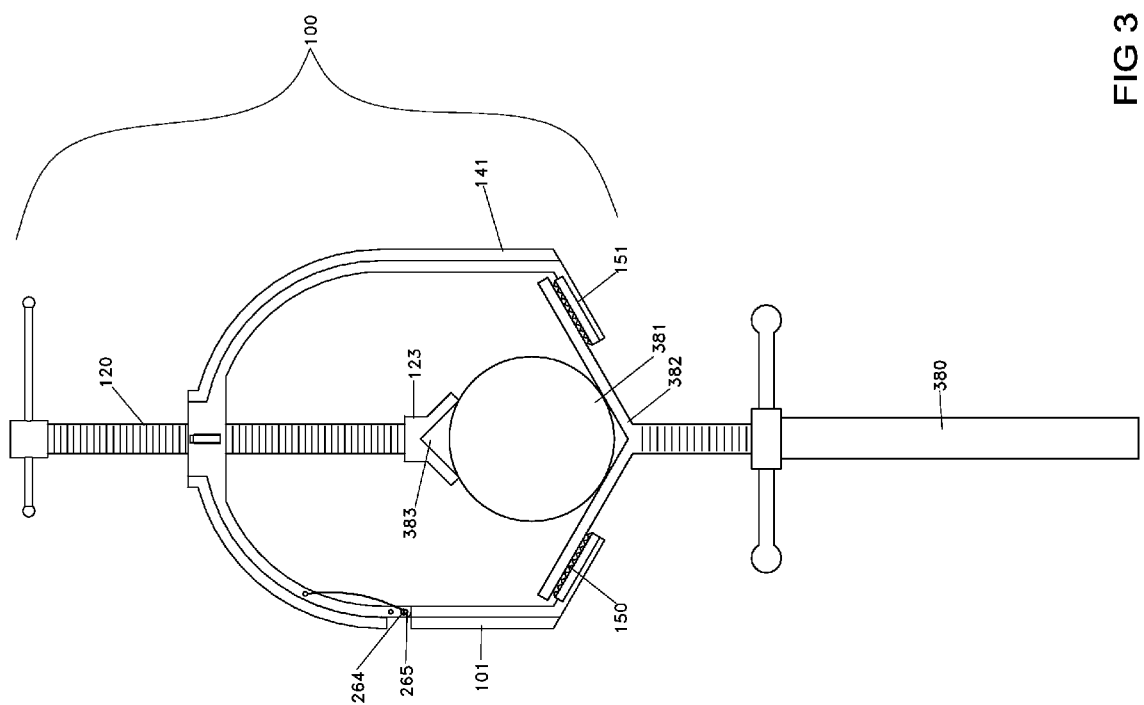
FIG. 3/8 is a front view drawing of a pipe clamp device wherein the first pivoting arm and the second pivoting arm are both in a closed position, and the pipe clamp device is being used with a standard jack stand to secure an object according to an embodiment.

FIG. 3/8 is a front view drawing of a pipe clamp device 100 wherein the first pivoting arm 101 and the second pivoting arm 141 are each in a closed position, and the pipe clamp device 100 is being used in conjunction with a standard jack stand 380 to secure an object 381 according to an embodiment.

The pipe clamp device 100 can be used in connection with a jack stand 380 to secure an object 381. In an embodiment, the object 381 can be secured to a cradle 382 of the jack stand 380 by placing the object 381 in the cradle 382 of the jack stand 380 and placing both the first gripping ear 150 and the second gripping ear 151 below the cradle 382. The first locking pin 264 can be inserted into the first locking hole 265. The swivel vee 123 can be moved downward against the object 381 by turning the threaded rod 120. As the swivel vee 123 presses downward against the object 381, the first gripping ear 150 and the second gripping ear 151 can be raised up until they are each pressed snugly against the bottom of the cradle 382. In an embodiment, the swivel vee 123 can comprise an angle 383 opposite the threaded rod 120, which can receive the object 381, thus helping to further secure the object 381 and prevent it from rolling or slipping.

Figure 4:
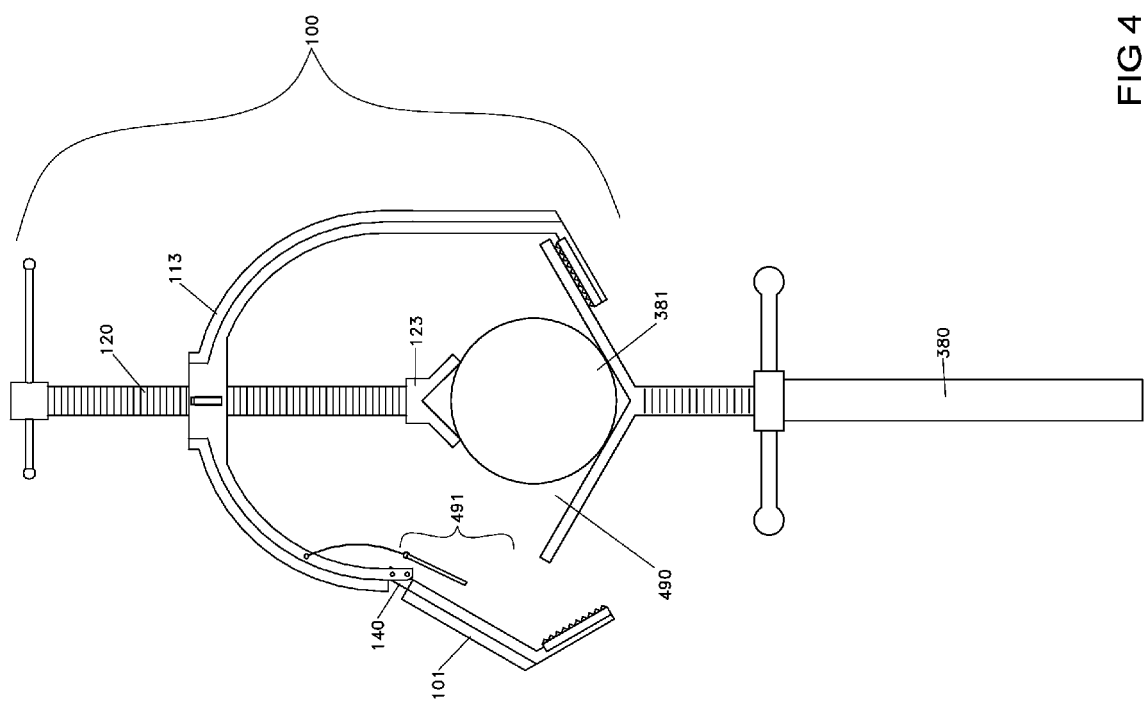
FIG. 4/8 is a front view drawing of a pipe clamp device wherein a first pivoting arm is in an open position while in use with a standard jack stand and object according to an embodiment.

FIG. 4/8 is a front view drawing of a pipe clamp device 100 wherein a first pivoting arm 101 is in an open position while in use with a jack stand 380 and an object 381 according to an embodiment.

In an embodiment, an object 381 can be removed from the work area 490 of the pipe clamp device 100 by rotating the threaded rod 120 so as to move the swivel vee 123 upward toward the closed end 113 sufficiently so that the first pivoting arm 101 can be rotated into an open position about a first hinge 140 creating a first opening 491 wherein the object 381 can be removed from the work area 490. (The release button 109 can also be used to allow the threaded rod 120 to be moved upward toward the closed end 113 of the pipe clamp device 100.) Such use of the first hinge 140 can be beneficial when more than one of the same sized or similarly sized objects 381 are to be secured separately by the pipe clamp device 100 because the threaded rod 120 will not need to be adjusted as much to remove one object 381 from the work area 490 and insert and secure a new object (not pictured) into the work area 490 thus saving valuable time when transitioning from one object 381 to the next (not shown) which is commonly required when performing work on such objects.

Figure 5:
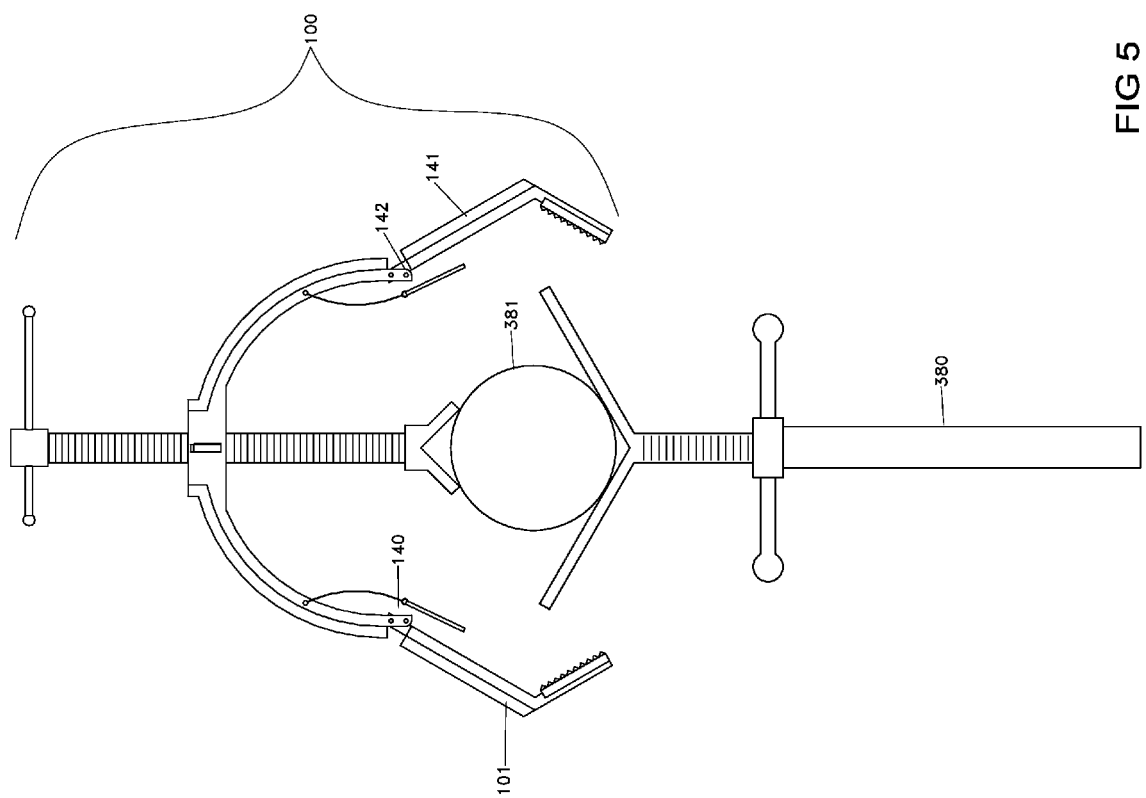
FIG. 5/8 is a front view drawing of a pipe clamp device wherein a first pivoting arm and a second pivoting arm are both in open positions while in use with a standard jack stand in preparation to secure an object according to an embodiment.

FIG. 5/8 is a front view of a pipe clamp device 100 wherein a first pivoting arm 101 and a second pivoting arm 141 are each in open positions while in use with a jack stand 380 in preparation to secure an object 381 according to an embodiment.

A second hinge 142 can be located on the second pivoting arm 141. The use of two hinges 140 and 142 can provide greater flexibility for the use of the pipe clamp device 100 by allowing the insertion or removal of the pipe clamp device 100, or an object 381 when only movement in a vertical direction is available or when objects 381 need to be inserted into or removed from the pipe clamp device 100 from either side of the device.

Figure 6:
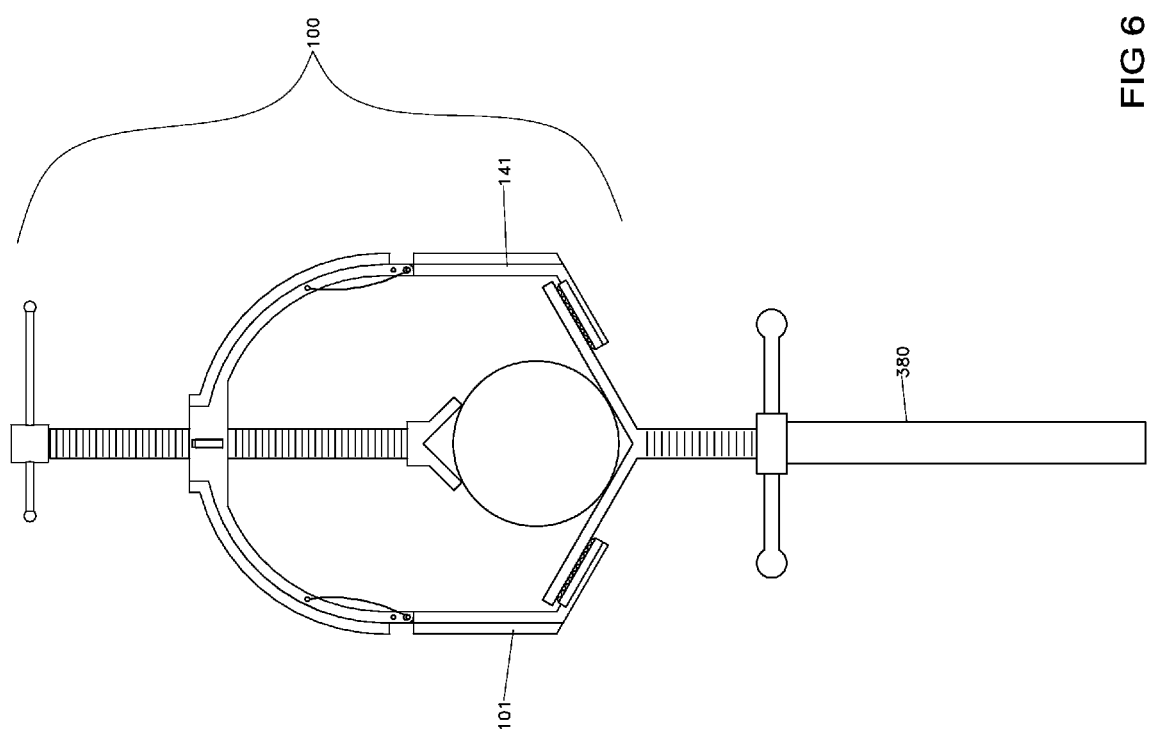
FIG. 6/8 is a front view of a pipe clamp device wherein a first pivoting arm and a second pivoting arm are each in closed positions while in use with a standard jack stand to secure an object according to an embodiment.

FIG. 6/8 is a front view of a pipe clamp device 100 wherein a first pivoting arm 101 and a second pivoting arm 141 are both in closed positions while in use with a standard jack stand 380 to secure an object 381 according to an embodiment.

All parts of the pipe clamp device 100 can be comprised in whole or in part of metal, wood, plastic, or any other suitable material known to those of average skill in the relevant art, or a combination of such materials. In an embodiment, each component can be made from steel.

Figure 7:
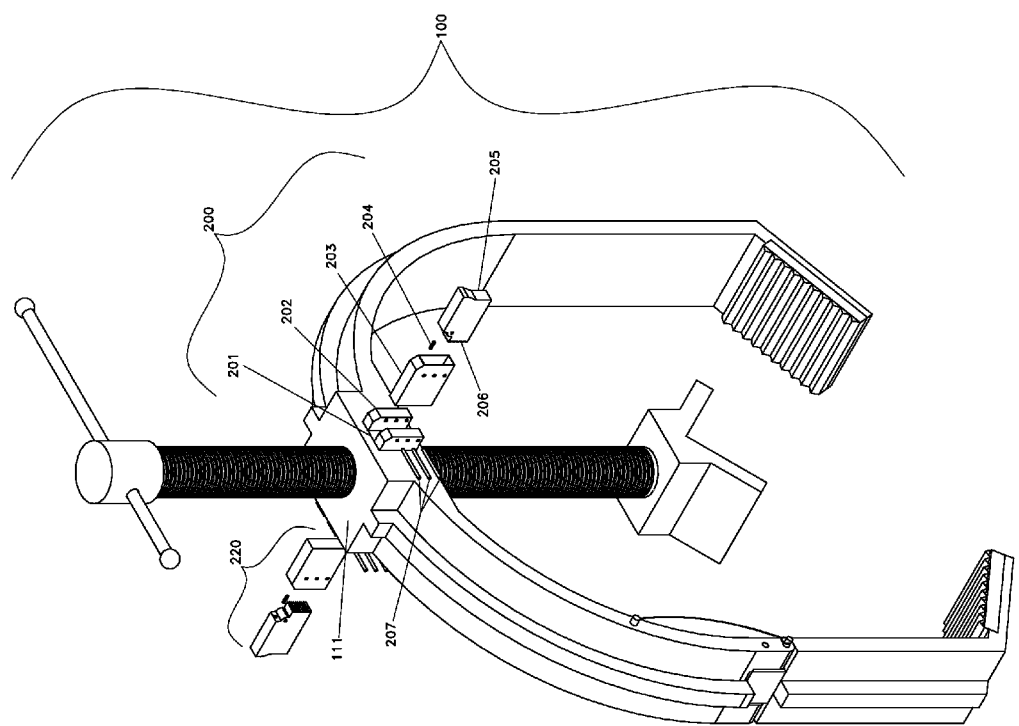
FIG. 7/8 is a partially exploded, perspective front, top and side view drawing of a pipe clamp device having both a first pivoting arm in a closed position and a quick release mechanism.

FIG. 7/8 is a partially exploded perspective front, top and side view drawing of a pipe clamp device 100 having a first pivoting arm 101 in a closed position and an exploded view of a first quick release mechanism 200 and a second quick release mechanism 220 according to an alternative embodiment.

In this alternative embodiment, the head 111 can also comprise a quick release mechanism 200 located on at least one side or both sides of the clamp head 111 that can be used to allow the threaded rod 120 to move freely up and down through the threaded hole 112 when the quick release mechanism 200 is activated. The quick release mechanism 200 can further comprise a cut out section 201 on the side of the clamp head 111, a button mounting bracket 202 located near the opening of the cut out section 201, a quick release button sleeve 203, a spring 204, a spring loaded quick release button 205, and one or more retaining pins 207. In an embodiment, the bracket 201 can be connected to the clamp head 111 along two-sides of the cut out section 201. The quick release button sleeve 203 can be inserted into the cut out section 201 and the spring loaded quick release button 205 can then be inserted into the quick release button sleeve 203 wherein the spring 204 can be located at the inner side of the quick release button 205 so that tension pressing outward against the quick release button 205 can be maintained. The spring loaded quick release button 205 can comprise acme threads 206 at one end wherein the acme thread 206 can allow the quick release mechanism 200 to either engage or disengage the threaded rod 120.

In another alternative embodiment, an identical quick release mechanism 220, having identical parts can be located on the opposite side of the head 111. When the quick release button 205 is pushed, it releases the threads 206 and allows the threaded rod 120 to move up and down, quickly and freely for a quick action use of the pipe clamp device 100. When the quick release button 205 is released, the threaded side 206 of the quick release button 205 can engage with the threaded rod 120, which can then be tightened to a desired tightness, for fine tune adjustment.

Figure 8:
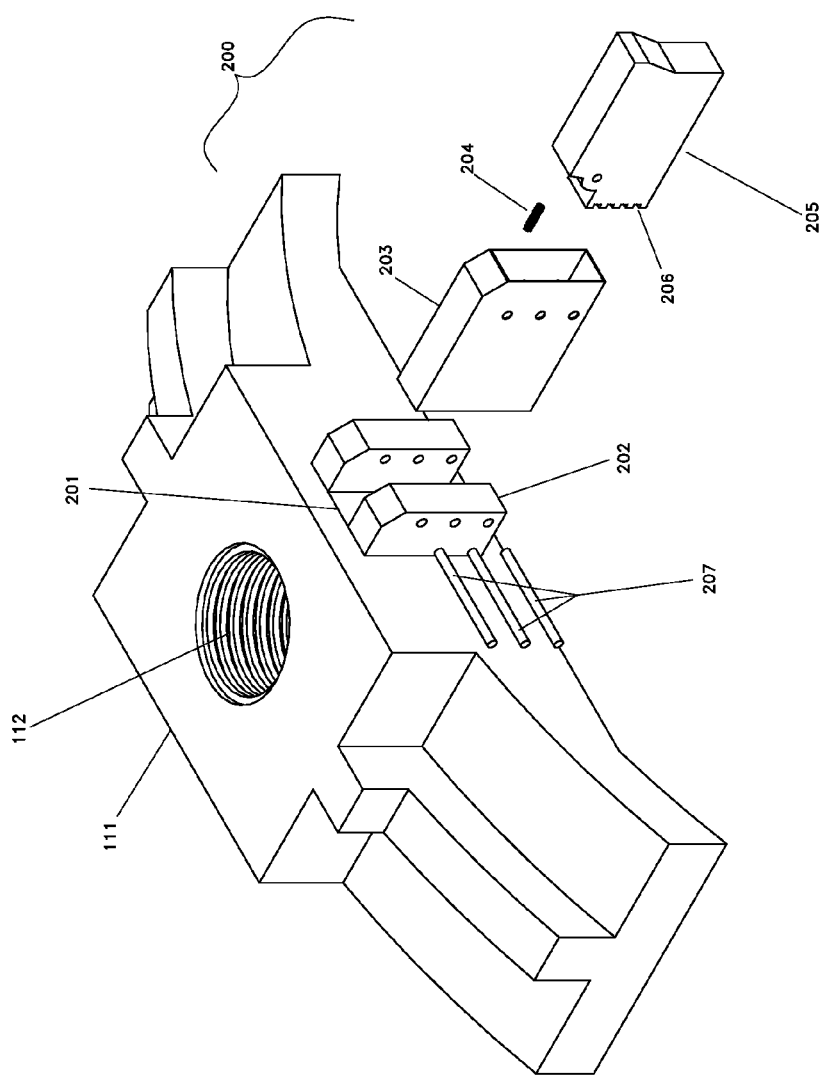
FIG. 8/8 is a perspective front, top and side view cutaway drawing of the head of a pipe clamp device also showing an exploded view of a quick release mechanism according to an embodiment.

FIG. 8/8 is a perspective front, top and side view cutaway drawing of the head 111 of a pipe clamp device 100 also showing an exploded view of a quick release mechanism 200 according to an embodiment. As also described above, the head 111 can also comprise a quick release mechanism 200 located on at least one side of the clamp head 111 that can be used to allow the threaded rod (not shown) to move freely up and down through the threaded hole 112. The quick release mechanism 200 can further comprise a cut out section 201 on the side of the clamp head 111, a button mounting bracket 202 located near the cut out section 201, a quick release button sleeve 203, a spring 204, a spring loaded quick release button 205, and one or more retaining pins 207. The bracket 201 can be connected to the clamp head 111 along two-sides of the cut out section 201. The quick release button sleeve 203 can be inserted into the cut out section 201. The spring loaded quick release button 205 can be inserted into the quick release button sleeve 203 wherein the spring 204 can be located at the inner side of the quick release button 205 so that tension pressing outward against the quick release button 205 can be maintained. The spring loaded quick release button 205 can comprise acme threads 206 at one end wherein the acme thread 206 can allow the quick release mechanism 200 to either engage or disengage the threaded rod 120.

Although the present device and method for its use has been described in terms of exemplary embodiments, it is not limited thereto. Rather, the appended claims should be construed broadly, to include other variants and embodiments of the device, which may be made by those skilled in the art without departing from the scope and range of equivalents of the present pipe clamp.

What is claimed is:

1. A pipe clamp device for use with a standard vee head jack stand, the pipe clamp device comprising:
    an inverted U-shaped main body comprising a closed top end and an open bottom end, an inner surface and an outer surface; the open bottom end of the inverted U-shaped main body comprising a first stationary arm, having an inner surface and an outer surface, and having a lower end and a second stationary arm, having an inner surface and an outer surface, and having a lower end, wherein the second stationary arm comprises a second gripping ear at said lower end;
    the closed top end of the inverted U-shaped main body comprising a head, the head further comprising a threaded hole configured to receive a threaded rod;
    the threaded rod having a first end and a second end located within the threaded hole; and
    a first pivoting arm, having an inner surface and an outer surface, and having a first end and a second end, the first end of the first pivoting arm pivotably connected to the lower end of the first stationary arm by a first hinge, wherein the second end of the first pivoting arm comprises a first gripping ear where said U-shaped main body is an unitary structure across main body approximately from each mid-point connecting said first and second stationary arm with said first pivoting arm being connected approximately to the midpoint of said first end.

2. A pipe clamp device as described in claim 1 wherein the first pivoting arm is configured to be locked into a closed position by a first locking pin that is configured to be placed through a first locking pin hole, wherein the first locking pin hole is configured to extend through the lower end of the first stationary arm and the first end of the first pivoting arm.

3. A pipe clamp device as described in claim 1 wherein the first gripping ear and the second gripping ear each comprise one or more serrated pads.

4. A pipe clamp device as described in claim 1 wherein the threaded rod comprises a handle connected to said first end and a swivel vee connected to said second end.

5. A pipe clamp device as described in claim 1 wherein the outer surface of the main body comprises a reinforcing rib.

6. A pipe clamp device as described in claim 1 wherein the outer surface of the first pivoting arm comprises a reinforcing rib.

7. A pipe clamp device as described in claim 1 wherein the head comprises a release button for releasing the threaded rod from the main body.

8. A pipe clamp device as described in claim 1 wherein the head comprises a quick release mechanism, the quick release mechanism comprising:
    a cut out section located within the head, wherein the cutout section is connected to the threaded hole;
    a spring loaded quick release button configured to be located within the cut out section; and
    at least one hardened pin;
    wherein, the said spring loaded quick release button further comprises acme threads at one end.

9. A pipe clamp device for use with a standard vee head jack stand, the pipe clamp device comprising:
    an inverted U-shaped main body comprising a closed top end and an open bottom end, an inner surface and an outer surface;
    the open bottom end of the inverted U-shaped main body comprising a first stationary arm, having an inner surface and an outer surface, and having a lower end and a second stationary arm, having an inner surface and an outer surface, and having a lower end, wherein the second stationary arm comprises a second gripping ear at said lower end;
    the closed top end of the inverted U-shaped main body comprising a head, the head further comprising a threaded hole configured to receive a threaded rod;
    the threaded rod having a first end and a second end located within the threaded hole;
    a first pivoting arm, having an inner surface and an outer surface, and having a first end and a second end, the first end of the first pivoting arm pivotably connected to the lower end of the first stationary arm by a first hinge, wherein the second end of the first pivoting arm comprises a first gripping ear; and
    a second pivoting arm, having an inner surface and an outer surface, and having a first end and a second end, the first end of the second pivoting arm pivotably connected to the lower end of the second stationary arm by a second hinge, wherein the second end of the second pivoting arm comprises a second gripping ear where said U-shaped main body is an unitary structure across main body substantially from each mid-point connecting said first and second stationary arm with said pivoting arm being connected substantially to the midpoint of said first end and second end.

10. A pipe clamp device as described in claim 9 wherein the first pivoting arm is configured to be locked into closed position by a first locking pin when the first locking pin is placed through a first locking pin hole, wherein the first locking pin hole extends through the lower end of the first stationary arm and the first end of the first pivoting arm, and the second pivoting arm is configured to be locked into closed position by a second locking pin when the second locking pin is placed through a second locking pin hole, wherein the second locking pin hole extends through the lower end of the second stationary arm and the first end of the second pivoting arm.

11. A pipe clamp device as described in claim 9 wherein the first gripping ear and the second gripping ear each comprise one or more serrated pads.

12. A pipe clamp device as described in claim 9 wherein the threaded rod comprises a handle connected to said first end and a swivel vee connected to its second end.

13. A pipe clamp device as described in claim 9 wherein the outer surface of the main body comprises a reinforcing rib.

14. A pipe clamp device as described in claim 9 wherein the outer surface of the first pivoting arm comprises a reinforcing rib.

15. A pipe clamp device as described in claim 9 wherein the head comprises a release button for releasing the threaded rod from the main body.

16. A pipe clamp device as described in claim 9 wherein the head comprises a quick release mechanism, the quick release mechanism comprising:
a cut out section located within the head, wherein the cutout section is connected to the threaded hole;
a spring loaded quick release button configured to be located within the cut out section; and
at least one hardened pin;
wherein, the said spring loaded quick release button further comprises acme threads at one end.

17. A method for securing an object to a standard vee head jack stand using a pipe clamp device, the method comprising:
providing a pipe clamp device, the pipe clamp device comprising:
an inverted U-shaped main body further comprising a closed top end and an open bottom end, an inner surface and an outer surface;
the open bottom end of the inverted U-shaped main body further comprising a first stationary arm having an inner surface and an outer surface and having a lower end and a second stationary arm having an inner surface and an outer surface and having a lower end, wherein the second stationary arm comprises a second gripping ear at said lower end;
the closed top end of the inverted U-shaped main body comprising a head, the head further comprising a threaded hole configured to receive a threaded rod;
the threaded rod having a first end and a second end located within the threaded hole; and
a first pivoting arm, having an inner surface and an outer surface, and having a first end and a second end, the first end of the first pivoting arm pivotably connected to the lower end of the first stationary arm by a first hinge, wherein the second end of the first pivoting arm further comprises a first gripping ear;
providing a standard vee head jack stand comprising a V-shaped cradle;
providing an object;
placing the object on the V-shaped cradle of the standard vee head jack stand, the V-shaped cradle having an upper surface and a lower surface;
moving the first pivoting arm of the pipe clamp device into an open position;
placing the pipe clamp device over the standard vee head jack stand so that the first gripping ear and the second gripping ear are each located near the lower surface of the V-shaped cradle and the object is within the inner surfaces of the first stationary arm, first pivoting arm and second stationary arm and the second end of the threaded rod is located directly above the object;
moving the first pivoting arm of the pipe clamp device into a closed position;
moving the threaded rod so that the second end of the threaded rod moves toward the open end of the pipe clamp device and away from the closed end of the pipe clamp device until the second end of the threaded rod makes contact with the object, and presses against the object and against the upper side of the V-shaped cradle and causing the first gripping ear and second gripping ear to move toward the V-shaped cradle and press against the V-shaped cradle where said U-shaped main body is an unitary structure across main body approximately from each mid-point connecting said first and second stationary arm with said first pivoting arm being connected approximately to the midpoint of said first end.

18. The method for securing an object to a standard vee head jack stand using a pipe clamp device as described in claim 17 wherein the pipe clamp device further comprises a first locking pin and a first locking pin hole and the first pivoting arm is configured to be locked into a closed position by inserting the first locking pin through the first locking pin hole, wherein the first locking pin is placed through the first locking pin hole to lock the first pivoting arm in a closed position after the pipe clamp device has been placed over the standard vee head jack stand so that the first gripping ear and the second gripping ear are each located near the lower surface of the V-shaped cradle and the object is within the inner surfaces of the first stationary arm, first pivoting arm and second stationary arm and the second end of the threaded rod is located directly above the object and the first pivoting arm of the pipe clamp device has been moved into a closed position.

19. The method for securing an object to a standard vee head jack stand using a pipe clamp device as described in claim 17 wherein the threaded rod comprises a handle connected to said first end and a swivel vee connected to said second end and the handle is turned in order to rotate the threaded rod and move the second end of the threaded rod toward the open end of the pipe clamp device and toward the object being secured.

20. The method for securing an object to a standard vee head jack stand using a pipe clamp device as described in claim 17 wherein the head comprises a release button for releasing the threaded rod from the main body and the release button is released and the threaded rod and the second end of the threaded rod are moved toward the open end of the pipe clamp device and toward the object being secured.

* * * * *